US012624308B2

(12) United States Patent
Fernández Prieto et al.

(10) Patent No.: US 12,624,308 B2
(45) Date of Patent: May 12, 2026

(54) BIODEGRADABLE DELIVERY PARTICLES

(71) Applicant: Encapsys, LLC, Appleton, WI (US)

(72) Inventors: Susana Fernández Prieto, Brussels (BE); Valerie Francine Hans Eykens, Brussels (BE); Rita Del Pezzo, Brussels (BE); Johan Smets, Brussels (BE); Linsheng Feng, Menasha, WI (US); Fadi Selim Chakar, Neenah (BE); Travis Ian Bardsley, Appleton, WI (US); Robert Stanley Bobnock, Menasha, WI (US)

(73) Assignee: Encapsys, LLC, Appleton, WI (US)

( * ) Notice: Subject to any disclaimer, the term of this patent is extended or adjusted under 35 U.S.C. 154(b) by 394 days.

(21) Appl. No.: 18/252,846

(22) PCT Filed: Nov. 18, 2021

(86) PCT No.: PCT/US2021/059875
§ 371 (c)(1),
(2) Date: May 12, 2023

(87) PCT Pub. No.: WO2022/109127
PCT Pub. Date: May 27, 2022

(65) Prior Publication Data
US 2024/0002745 A1 Jan. 4, 2024

Related U.S. Application Data

(60) Provisional application No. 63/116,134, filed on Nov. 19, 2020.

(51) Int. Cl.
*C11D 3/00* (2006.01)
*B01J 13/16* (2006.01)
*C11B 9/00* (2006.01)
*C11D 3/50* (2006.01)

(52) U.S. Cl.
CPC ............. *C11B 9/0007* (2013.01); *B01J 13/16* (2013.01); *C11D 3/505* (2013.01)

(58) Field of Classification Search
CPC ........ C11B 9/0007; B01J 13/16; C11D 3/505; C11D 17/0039; A61K 8/37; A61K 2800/412; A61K 8/11; A61K 8/736; A61K 8/8152; Y02W 90/10; A61Q 13/00; C05G 5/37; C08L 75/16; A01N 25/26
USPC ........................................................ 510/337
See application file for complete search history.

(56) References Cited

U.S. PATENT DOCUMENTS

| | | | | |
|---|---|---|---|---|
| 4,138,362 | A | 2/1979 | Vassiliades | |
| 5,925,595 | A | 7/1999 | Seitz | |
| 8,067,355 | B2 | 11/2011 | Smets | |
| 8,455,098 | B2 | 6/2013 | Schwantes | |
| 8,551,935 | B2 | 10/2013 | Smets | |
| 9,243,215 | B2 | 1/2016 | Dihora | |
| 9,271,905 | B2 | 3/2016 | Struillou | |
| 9,714,397 | B2 | 7/2017 | Feng | |
| 10,092,485 | B2 | 10/2018 | Smets | |
| 10,398,632 | B2 | 9/2019 | Aussant | |
| 10,537,503 | B2 | 1/2020 | Lei | |
| 10,844,321 | B2 | 11/2020 | Sivik | |
| 11,085,008 | B2 | 8/2021 | Dihora | |
| 11,260,359 | B2 | 3/2022 | Neuman | |
| 2011/0111999 | A1* | 5/2011 | Smets | B01J 13/06 510/516 |
| 2013/0330292 | A1 | 12/2013 | Lei | |
| 2016/0130537 | A1* | 5/2016 | Fernandez Prieto | C11D 3/42 510/106 |
| 2017/0326522 | A1 | 11/2017 | Burakowska-Meise | |
| 2017/0360676 | A1 | 12/2017 | Dihora | |
| 2018/0360706 | A1* | 12/2018 | Dihora | A61Q 5/02 |
| 2019/0364888 | A1 | 12/2019 | Urch | |
| 2020/0046616 | A1 | 2/2020 | Lei | |
| 2020/0360889 | A1 | 11/2020 | Ortais | |
| 2021/0252469 | A1 | 8/2021 | Linsheng | |
| 2022/0175636 | A1 | 6/2022 | Popplewell | |
| 2022/0177815 | A1 | 6/2022 | Popplewell | |

FOREIGN PATENT DOCUMENTS

| | | | |
|---|---|---|---|
| WO | 2006120523 | 11/2006 | |
| WO | WO 2011056904 A1 * | 5/2011 | C11D 1/12 |
| WO | 2016056924 | 4/2016 | |
| WO | 2018053356 | 3/2018 | |
| WO | 2019063515 | 4/2019 | |
| WO | 2019179939 | 9/2019 | |
| WO | 2020209907 | 10/2020 | |
| WO | 2020209909 | 10/2020 | |

OTHER PUBLICATIONS

International Search Report PCTUS 2021059875.
Doyeon Kim , Sumi Kim, Seongyeon Jo, Junghoon Woo and Insup Noh, Effect of Cross-linking Spacers on Biocompatibility of Chitonsan-Spacer-Poly(ethylene oxide) Hydrogel, Dept of Chemical Engineering, Seoul National University; Macromolecular Research, vol. 19, No. 6, pp. 573-581 (2011).
Shin Choon Kang, Yoo Jeong Choi, Hyung Zip Kim, Jin Burm Kyong, Dong Kook Kim, "Kinetics of Acrylamide Solution Polymerization using Potassium Persulfate as an Initiator by an in situ IR", Depts of Chemical Engineering, and Chemistry, Hanyang University; Macromolecular Research, vol. 12, No. 1, pp. 107-111 (2004).

* cited by examiner

*Primary Examiner* — Eisa B Elhilo
(74) *Attorney, Agent, or Firm* — Daniel Ward

(57) ABSTRACT

A biodegradable delivery particle having a benefit agent containing core and a shell.

28 Claims, No Drawings

BIODEGRADABLE DELIVERY PARTICLES

CROSS REFERENCE TO RELATED APPLICATIONS

This application is a national stage (§ 371) application of International Application PCT/US2021/059875 filed Nov. 18, 2021, which claims benefit of U.S. Provisional Application No. 63/116,134 filed Nov. 19, 2020.

Encapsys, LLC (formerly known as the Encapsys division of Appleton Papers Inc.) and The Procter & Gamble Company executed a Joint Research Agreement on or about Nov. 28, 2005 and this invention was made as a result of activities undertaken within the scope of that Joint Research Agreement between the parties that was in effect on or before the date of this invention.

FIELD OF THE INVENTION

The invention relates to biodegradable delivery particles having a benefit agent containing core and a wall.

BACKGROUND OF THE INVENTION

Microencapsulation is a process where droplets of liquids, particles of solids or gasses are enclosed inside a solid shell and are generally in the micro-size range. The core material is then mechanically separated from the surrounding environment through a membrane (Jyothi et al., *Journal of Microencapsulation,* 2010, 27, 187-197). Microencapsulation technology is attracting attention from various fields of science and has a wide range of commercial applications for different industries. Overall, capsules are capable of one or more of (i) providing stability of a formulation or material via the mechanical separation of incompatible components, (ii) protecting the core material from the surrounding environment, (iii) masking or hiding an undesirable attribute of an active ingredient and (iv) controlling or triggering the release of the active ingredient to a specific time or location. All of these attributes can lead to an increase of the shelf-life of several products and a stabilization of the active ingredient in liquid formulations.

Encapsulation can be found in areas such as pharmaceuticals, personal care, textiles, food, coatings and agriculture. In addition, the main challenge faced by microencapsulation technologies in real-world commercial applications is that a complete retention of the encapsulated active within the capsule is required throughout the whole supply chain, until a controlled or triggered release of the core material is applied (Thompson et al., *Journal of Colloid and Interface Science,* 2015, 447, 217-228). There are significantly limited microencapsulation technologies that are safe for both the environment and human health with a long-term retention and active protection capability that can fulfill the needs of the industry nowadays, especially when it comes to encapsulation of small molecules.

Over the past several years, consumer goods manufacturers have used core-shell encapsulation techniques to preserve actives, such as benefit agents, in harsh environments and to release them at the desired time, which may be during or after use of the consumer goods. Among the several mechanisms that can be used for release of benefit agent, the one commonly relied upon is mechanical rupture of the capsule shell. Selection of mechanical rupture as the release mechanism constitutes another challenge to the manufacturer, as rupture must occur at specific desired times, even if the capsules are subject to mechanical stress prior to the desired release time.

Industrial interest for encapsulation technology has led to the development of several polymeric capsules chemistries which attempt to meet the requirements of biodegradability, low shell permeability, high deposition, targeted mechanical properties and rupture profile. Increased environmental concerns have put the polymeric capsules under scrutiny, therefore manufacturers have started investigating sustainable solutions for the encapsulation of benefit agents.

Biodegradable materials exist and are able to form delivery particles via coacervation, spray-drying or phase inversion precipitation. However, the delivery particles formed using these materials and techniques are highly porous and not suitable for aqueous compositions containing surfactant, since the benefit agent is prematurely released to the composition.

Non-leaky and performing delivery particles in aqueous surfactant-based compositions exist, however due to its chemical nature and cross-linking, they are not biodegradable.

Delivery particles are needed that are biodegradable, yet have high structural integrity so as to reduce leakage and resist damage from harsh environments.

DETAILED DESCRIPTION OF THE INVENTION

In accordance with embodiments, delivery particles with improved biodegradability comprising a core substantially enclosed in a polymer wall, the core comprising a benefit agent and a partitioning modifier, and the polymer wall obtained by the reaction of polymerizable monomers, such as (meth)acrylate monomers, with water soluble hydroxyl containing linear carbon-chain polymer comprising 1,2-diol and/or 1,3-diol functionality to initiate the polymerization of the wall. Examples of natural and synthetic biodegradable polymers include chitosan and polyvinyl alcohol respectively.

The present invention includes novel delivery particles produced from cross-linking biodegradable polymers with smaller monomers in order to enhance the bioavailability of the wall and the biodegradability of the overall delivery particle. Without being bound by theory, it is believed that the biodegradable polymers form a network that enhances the accessibility of the enzymes during degradation process, while the small monomers close the delivery particle structure making it compacted enough to protect the benefit agent in an aqueous surfactant-based composition.

Definitions

As used herein "consumer product" means baby care, beauty care, fabric & home care, family care, feminine care, health care, snack and/or beverage products or devices intended to be used or consumed in the form in which it is and not intended for subsequent commercial manufacture or modification. Such products include but are not limited to fine fragrances (e.g. perfumes, colognes eau de toilettes, after-shave lotions, pre-shave, face waters, tonics, and other fragrance-containing compositions for application directly to the skin), diapers, bibs, wipes; products for and/or methods relating to treating hair (human, dog, and/or cat), including, bleaching, coloring, dyeing, conditioning, shampooing, styling; deodorants and antiperspirants; personal cleansing; cosmetics; skin care including application of creams, lotions, and other topically applied products for consumer use; and shaving products, products for and/or methods relating to treating fabrics, hard surfaces and any other surfaces in the area of fabric and home care, including: air care, car care, dishwashing, fabric conditioning (including softening), laundry detergency, laundry and rinse additive and/or care, hard surface cleaning and/or treatment, and other cleaning for consumer or institutional use; products and/or methods relating to bath tissue, facial tissue, paper handkerchiefs, and/or paper towels; tampons, feminine napkins; products and/or methods relating to oral care including toothpastes, tooth gels, tooth rinses, denture adhesives, tooth whitening; over-the-counter health care including cough and cold remedies, pain relievers, RX pharmaceuticals, pet health and nutrition, and water purification.

As used herein, the term "cleaning composition" includes, unless otherwise indicated, granular or powder-form all-purpose or "heavy-duty" washing agents, especially cleaning detergents; liquid, gel or paste-form all-purpose washing agents, especially the so-called heavy-duty liquid types; liquid fine-fabric detergents; hand dishwashing agents or light duty dishwashing agents, especially those of the high-foaming type; machine dishwashing agents, including the various pouches, tablet, granular, liquid and rinse-aid types for household and institutional use; liquid cleaning and disinfecting agents, including antibacterial hand-wash types, cleaning bars, mouthwashes, denture cleaners, dentifrice, car or carpet shampoos, bathroom cleaners; hair shampoos and hair-rinses; shower gels and foam baths and metal cleaners; as well as cleaning auxiliaries such as bleach additives and "stain-stick" or pre-treat types, substrate-laden products such as dryer added sheets, dry and wetted wipes and pads, nonwoven substrates, and sponges; as well as sprays and mists.

As used herein, the term "fabric care composition" includes, unless otherwise indicated, fabric softening compositions, fabric enhancing compositions, fabric freshening compositions and combinations thereof. The form of such compositions includes liquids, gels, beads, powders, flakes, and granules.

As used herein, the phrase "benefit agent containing delivery particle" encompasses microcapsules including perfume microcapsules.

As used herein, the terms "delivery particle", "benefit agent containing delivery particle", "encapsulated benefit agent", "capsule" and "microcapsule" are synonymous.

As used herein, reference to the term "(meth)acrylate" or "(meth)acrylic" is to be understood as referring to both the acrylate and the methacrylate versions of the specified monomer, oligomer and/or prepolymer, (for example "allyl (meth)acrylate" indicates that both allyl methacrylate and allyl acrylate are possible, similarly reference to alkyl esters of (meth)acrylic acid indicates that both alkyl esters of acrylic acid and alkyl esters of methacrylic acid are possible, similarly poly(meth)acrylate indicates that both polyacrylate and potymethacrylate are possible).

For purposes of this application, the partitioning modifier is not considered a perfume raw material and thus it is not considered when calculating perfume compositions/formulations. Thus, the amount of partitioning modifier present is not used to make such calculations.

As used herein the term "water soluble material" means a material that has a solubility of at least 0.5% wt in water at 60° C.

As used herein the term "oil soluble" means a material that has a solubility of at least 0.1% wt in the core of interest at 50° C.

As used herein the term "oil dispersible" means a material that can be dispersed at least 0.1% wt in the core of interest at 50° C. without visible agglomerates.

As used herein, the articles including "a" and "an" when used in a claim, are understood to mean one or more of what is claimed or described.

As used herein, the terms "include", "includes" and "including" are meant to be non-limiting.

Unless otherwise noted, all component or composition levels are in reference to the active portion of that component or composition, and are exclusive of impurities, for example, residual solvents or by-products, which may be present in commercially available sources of such components or compositions.

All percentages and ratios are calculated by weight unless otherwise indicated. All percentages and ratios are calculated based on the total composition unless otherwise indicated.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

As used herein, the terms "site" or "site of attachment" or "point of attachment" all mean an atom (e.g. A) having an open valence within a chemical group or defined structural entity that is designated with a symbol (*–A) to indicate that the so-designated atom A connects to another atom in a separate chemical group via a covalent chemical bond.

As used herein "biodegradable" refers to a material that has above 30% $CO_2$ release according to the OECD301B test method.

Consumer Product Composition

The present disclosure relates to consumer product composition that may comprise a population of delivery particles and a treatment adjunct, each described in more details below.

Delivery Particle

The consumer product composition of the present invention comprises a delivery particle comprising a core and a wall encapsulating said core.

The wall is formed by a radical polymerization reaction between:

- a water soluble hydroxyl containing linear carbon-chain polymer comprising 1,2-diol and/or 1,3-diol functionality;
- a multifunctional (meth)acrylate monomer and/or oligomer;
- optionally, a mono- and/or di-functional monomer and/or oligomer;
- at least one water soluble thermal free radical initiator;
- at least one oil soluble thermal free radical initiator;

wherein at least one of the water soluble initiators is a persulfate and the water soluble hydroxyl containing linear carbon-chain polymer forms carbon/carbon and/or oxygen/carbon bonds with the multifunctional (meth)acrylate monomer and/or oligomer. In preferred embodiments, the water soluble hydroxyl containing linear carbon-chain polymer may form carbon/carbon bonds with the multifunctional (meth)acrylate monomer and/or oligomer.

In embodiments, the water soluble hydroxyl containing polymer may be partially acetylated or substituted.

In embodiments, the water soluble hydroxyl containing polymer has a degree of hydrolysis from about 55% to about 99%, preferably from about 75% to about 95%, more preferably from about 85% to about 90% and most preferably from about 87% to about 89%. In embodiments, the water soluble hydroxyl containing linear carbon-chain polymer has a molecular weight from about 30 kDa to about 500 kDa, preferably from about 50 kDa to about 300 kDa, even more preferably from about 80 kDa to about 200 kDa.

In embodiments, the wall may further comprise a polysaccharide selected from the group consisting of chitosan, chitin, pectin, carrageenan, cellulose, xanthan gum, tara gum, konjac gum, alginate, hyaluronic acid, amylose, lignin, diutan gum, and mixtures thereof.

In embodiments, the polysaccharide may be chitosan and/or chitin, and preferably with a degree of deacetylation ("DDA") of at least 50%, preferably at least 65% and more preferably at least 75%. In embodiments, the chitosan has a weight average molecular weight from about to about 500 kDa, preferably from about 50 kDa to about 300 kDa, even more preferably from about 80 kDa to about 200 kDa.

In embodiments, the polysaccharide may be from about 2% to about 65%, preferably at least 5%, more preferably at least 10%, even more preferably at least 20% weight percentage of the total wall weight.

In embodiments, the water soluble hydroxyl containing linear carbon-chain polymer may be from about 20% to about 95%, preferably at least 30%, even more preferably at least 40% weight percentage of the total wall weight. In embodiments, the water soluble hydroxyl containing linear carbon-chain polymer may be from about 50% to about 75% weight percentage of the total wall weight In embodiments, the water soluble hydroxyl containing linear carbon-chain polymer and/or polysaccharide has a biodegradability from about 30% to about 100% $CO_2$ in 60 days following OECD 301B test, preferably above 40% $CO_2$, more preferably above 50% $CO_2$, even more preferably above 60% $CO_2$.

In embodiments, the polymer wall further comprises at least one multi-functional (meth)acrylate monomer and/or oligomer. In embodiments, the one or more oil-soluble or oil-dispersible multifunctional monomers or oligomers may comprise at least two radical polymerizable functional groups, preferably at least three, preferably at least four, more preferably at least five, even more preferably at least six. In embodiments, the one or more oil-soluble or oil-dispersible multifunctional (meth)acrylate monomers or oligomers may comprise more than six radical polymerizable functional groups. It is believed that monomers comprising a relatively greater number of radical polymerizable groups result in, for example, delivery particles with more compact walls and having preferred properties, such as less leakage, compared to walls formed from monomers that have fewer radical polymerizable groups.

In embodiments, at least two, or at least three, or at least four, or at least five, or at least six of the radical polymerizable functional groups are an acrylate or methacrylate group. Preferably, the radical polymerizable functional groups are each independently selected from the group consisting of acrylate and methacrylate. In embodiments, the radical polymerizable groups of the multi-functional monomer and/or oligomer are all the same. It is believed that these functional groups result in delivery particles having preferred properties, such as less leakage at high core:wall ratios, compared to other functional groups. In embodiments delivery particles may have leakage values of below about 50% or below about 30%, as determined by the Leakage Test described in the TEST METHODS Section.

The oil-soluble or oil-dispersible multifunctional (meth) acrylate monomers or oligomers may comprise a multifunctional aromatic urethane acrylate. Preferably, the oil-soluble or oil-dispersible multifunctional (meth)acrylate monomers or oligomers comprises a hexafunctional aromatic urethane acrylate.

In embodiments, the multifunctional (meth)acrylate monomer and/or oligomer may be from about 5% to about 50%, preferably at least 10%, even more preferably at least 20% weight percentage of the total wall weight.

Additionally, or alternatively, the oil-soluble or oil-dispersible multifunctional (meth)acrylate monomers or oligomers may comprise a multifunctional aliphatic urethane acrylate.

The wall may be formed from at least two different multifunctional (meth)acrylate monomers, for example first and second multifunctional (meth)acrylate monomers. The first multifunctional (meth)acrylate monomer may comprise a different number of radical polymerizable functional groups compared to the second multifunctional (meth)acrylate monomer. For example, the first multifunctional (meth) acrylate monomer may comprise six (meth)acrylate groups (e.g., hexafunctional), and the second multifunctional (meth)acrylate monomer may comprise less than six (meth) acrylate groups, such as a number selected from two (e.g., difunctional), three (e.g., trifunctional), four (e.g., tetrafunctional), or five (e.g., pentafunctional), preferably five. In embodiments, the first and second multifunctional (meth) acrylate monomers may comprise the same number of radical polymerizable functional groups, such as six (e.g., both monomers are hexafunctional), although the respective monomers are characterized by different structures or chemistries. In embodiments, the first and second multifunctional (meth)acrylate monomers may comprise different number of radical polymerizable functional groups, such as six and two.

In addition to the oil-soluble or oil-dispersible multifunctional (meth)acrylate monomer or oligomer, the wall may be further formed by a water-soluble or water-dispersible multifunctional (meth)acrylate monomer or oligomer, which may include a hydrophilic functional group. The water-soluble or water-dispersible multifunctional (meth) acrylate monomer or oligomer may be preferably selected from the group consisting of polyethylene glycol di(meth) acrylates, ethoxylated multi-functional (meth)acrylates, and mixtures thereof, for example trimethylolpropane tri(meth) acrylate, ethylene glycol di(meth)acrylate, di-, tri- and tetraethyleneglycol di(meth)acrylate, dipropylene glycol di(meth)acrylate, polyethylene glycol di(meth)acrylate, di(pentamethylene glycol) di(meth)acrylate, ethylene di(meth)acrylate, neopentyl glycol di(meth)acrylate, trimethylol propane tri(meth)acrylate, diglycerol di(meth)acrylate, neopentyl di(meth)acrylate, trimethylolpropane tri(meth)acrylate, polyethylene glycol di(meth)acrylate and dipropylene glycol di(meth)acrylate and mixtures thereof. Such water-soluble or water-dispersible multifunctional (meth)acrylate monomer or oligomer may be added to the oil phase, to the water phase or to both of them during encapsulation process.

In embodiments, the mono- and/or di-functional monomer and/or oligomer may be independently selected from the group consisting of:

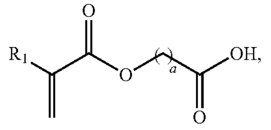

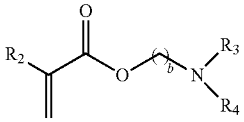

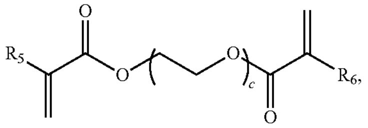

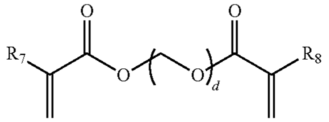

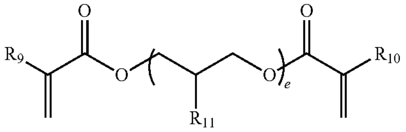

wherein $R_1$, R2, R5, R6, R7, R8, R9 and R10 are independently selected from the group consisting of a hydrogen (*—H) and a methyl group (*—$CH_3$);

a, b, c and d are integers independently selected from 1 to 10, preferably from 2 to 5, $R_3$ and $R_4$ are independently selected from the group consisting of

*—H, 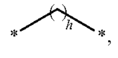, and 

h and i are integers independently selected from 0 to 10, preferably from 1 to 5;

$R_{11}$ is selected from the group consisting of hydroxyl (—OH), hydrogen (*—H), and methyl group (*—$CH_3$).

In embodiments, the wall may further comprise a monomer selected from an amine (meth)acrylate, an acidic (meth) acrylate, or a combination thereof.

Suitable amine (meth)acrylates for use in the particles of the present disclosure may include aminoalkyl acrylate or aminoalkyl methacrylate including, for example, but not by way of limitation, ethylaminoethyl acrylate, ethylaminoethyl methacrylate, aminoethyl acrylate, aminoethyl methacrylate, tertiarybutyl aminoethyl acrylate, tertiarybutyl aminoethyl methacrylate, diethylamino acrylate, diethylamino methacrylate, diethylaminoethyl acrylate, diethylaminoethyl methacrylate, dimethylaminoethyl acrylate and dimethylaminoethyl methacrylate. Preferably, the amine (meth)acrylate is aminoethyl acrylate or aminoethyl methacrylate, or tertiarybutyl aminoethyl methacrylate.

Suitable carboxy (meth)acrylates for use in particles of the present disclosure may include 2-carboxyethyl acrylate, 2-carboxyethyl methacrylate, 2-carboxypropyl acrylate, 2-carboxypropyl methacrylate, carboxyoctyl acrylate, carboxyoctyl methacrylate. Carboxy substituted aryl acrylates or methacrylates may include 2-acryloyloxybenzoic acid, 3-acryloyloxybenzoic acid, 4-acryloyloxybenzoic acid, 2-methacryloyloxybenzoic acid, 3-methacryloyloxybenzoic acid, and 4-methacryloyloxybenzoic acid. (Meth)acryloyloxyphenylalkylcarboxy acids by way of illustration and not limitation can include 4-acryloyloxyphenylacetic acid or 4-methacryloyloxyphenylacetic acid.

In embodiments, the wall may be further derived, at least in part, from at least one free radical initiator, preferably at least two free radical initiators, even more preferably at least three radical initiators. In embodiments, at least one free radical initiator may preferably comprise a water-soluble or water-dispersible free radical initiator. In embodiments, at least one free radical initiator may preferably comprise an oil-soluble or oil-dispersible free radical initiator. In a preferred embodiment, the wall may be formed, at least in part, from the combination of at least one water-soluble or water-dispersible free radical initiator and at least one oil-soluble or oil-dispersible free radical initiator. In embodiments, the wall is derived, at least in part, from a persulfate initiator selected from the group consisting of ammonium persulfate, sodium persulfate, potassium persulfate and mixtures thereof. Preferably, the persulfate initiator is potassium persulfate.

Without wishing to be bound by theory, it is believed that selecting the appropriate amount of initiator relative to total wall material (and/or wall monomers/oligomers) can result in improved capsules. For example, it is believed that levels of initiators that are too low may lead to poor polymer wall formation; levels that are too high may lead to encapsulate walls that have relatively low levels of structural monomers. In either situation, the resulting capsules may be relatively leaky and/or weak.

Thus, the amount of initiator present may be from about 0.1% to about 30%, preferably from about 0.5% to about 25%, more preferably from about 0.8% to about 15%, even more preferably from about 1% to about 10%, even more preferably from about 1% to about 8%, by weight of the wall. It is believed that relatively higher amounts of initiator within the disclosed ranges may lead to improved, less-leaky capsules. The optimal amount of initiator may vary according to the nature of the core material. The polymer wall may be derived from a first initiator and a second initiator, wherein the first and second initiators are present in a weight ratio of from about 5:1 to about 1:5, or preferably from about 3:1 to about 1:3, or more preferably from about 2:1 to about 1:2, or even more preferably from about 1.5:1 to about 1:1.5.

Suitable free radical initiators may include azo initiators. More particularly, and without limitation, the free radical initiator can be selected from the group consisting of 2,2'-azobis(isobutylnitrile), 2,2'-azobis(2,4-dimethylpentanenitrile), 2,2'-azobis (2,4-dimethylvaleronitrile), 2,2'-azobis(2-methylpropanenitrile), 2,2'-azobis(2-methylbutyronitrile), 1,1'-azobis (cyclohexanecarbonitrile), 1,1'-azobis(cyanocyclohexane), and mixtures thereof.

In embodiments, the water soluble hydroxyl containing polymer and/or polysaccharide may be fragmented by the water soluble initiator prior to form carbon/carbon. nitrogen/carbon and/or oxygen/carbon bonds with the multifunctional (meth)acrylate monomer and/or oligomer.

The delivery particles of the present disclosure include a core. The core may comprise a benefit agent. Suitable benefit agents located in the core may include benefit agents that provide benefits to a surface, such as a fabric or hair.

The core may comprise from about 40% to about 95%, preferably from about 50% to about 80%, more preferably from about 50% to about 70%, by weight of the core, of the benefit agent.

The benefit agent may be selected from the group consisting of fragrance, silicone oils, waxes, hydrocarbons, higher fatty acids, essential oils, lubricants, lipids, skin coolants, vitamins, sunscreens, antioxidants, glycerine, catalysts, bleach particles, silicon dioxide particles, malodor reducing agents, odor-controlling materials, chelating agents, antistatic agents, softening agents, insect and moth repelling agents, colorants, antioxidants, chelants, bodying agents, drape and form control agents, smoothness agents, wrinkle control agents, sanitization agents, disinfecting agents, germ control agents, mold control agents, mildew control agents, antiviral agents, drying agents, stain resistance agents, soil release agents, fabric refreshing agents and freshness extending agents, chlorine bleach odor control agents, dye fixatives, dye transfer inhibitors, color maintenance agents, optical brighteners, color restoration/rejuvenation agents, anti-fading agents, whiteness enhancers, anti-abrasion agents, wear resistance agents, fabric integrity agents, anti-wear agents, anti-pilling agents, defoamers, anti-foaming agents, UV protection agents, sun fade inhibitors, anti-allergenic agents, enzymes, water proofing agents, fabric comfort agents, shrinkage resistance agents, stretch resistance agents, stretch recovery agents, skin care agents, glycerin, synthetic or natural actives, antibacterial actives, antiperspirant actives, cationic polymers, dyes, and mixtures thereof. Preferably the benefit agent comprises fragrance, essential oils and mixtures thereof.

The encapsulated benefit agent may preferably a fragrance, which may include one or more perfume raw materials. The term "perfume raw material" (or "PRM") as used herein refers to compounds having a molecular weight of at least about 100 g/mol and which are useful in imparting an odor, fragrance, essence or scent, either alone or with other perfume raw materials. Typical PRMs comprise inter alia alcohols, ketones, aldehydes, esters, ethers, nitrites and alkenes, such as terpene. A listing of common PRMs can be found in various reference sources, for example, "Perfume and Flavor Chemicals", Vols. I and II; Steffen Arctander Allured Pub. Co. (1994) and "Perfumes: Art, Science and Technology", Miller, P. M. and Lamparsky, Blackie Academic and Professional (1994).

The PRMs may be characterized by their boiling points (B.P.) measured at the normal pressure (760 mm Hg), and their octanol/water partitioning coefficient (P), which may be described in terms of log P, determined according to the test method below. Based on these characteristics, the PRMs may be categorized as Quadrant I, Quadrant II, Quadrant III, or Quadrant IV perfumes, as described in more detail below.

The fragrance may comprise perfume raw materials that have a log P of from about 2.5 to about 4. It is understood that other perfume raw materials may also be present in the fragrance.

The perfume raw materials may comprise a perfume raw material selected from the group consisting of perfume raw materials having a boiling point (B.P.) lower than about 250° C. and a log P lower than about 3, perfume raw materials having a B.P. of greater than about 250° C. and a log P of greater than about 3, perfume raw materials having a B.P. of greater than about 250° C. and a log P lower than about 3, perfume raw materials having a B.P. lower than about 250° C. and a log P greater than about 3 and mixtures thereof. Perfume raw materials having a boiling point B.P. lower than about 250° C. and a log P lower than about 3 are known as Quadrant I perfume raw materials. Quadrant I perfume raw materials are preferably limited to less than 30% of the perfume composition. Perfume raw materials having a. B.P. of greater than about 250° C. and a log P of greater than about 3 are known as Quadrant IV perfume raw materials, perfume raw materials having a B.P. of greater than about 250° C. and a log P lower than about 3 are known as Quadrant II perfume raw materials, perfume raw materials having a B.P. lower than about 250° C. and a log P greater than about 3 are known as a Quadrant III perfume raw materials. Suitable Quadrant I, II, III and IV perfume raw materials are disclosed in U.S. Pat. No. 6,869,923 B1.

The core of the delivery particles of the present disclosure may further comprise a partitioning modifier. The properties of the partitioning modifier in the core can play a role in determining how much, how quickly, and/or how permeable the polyacrylate shell material will be when established at the oil/water interface. For example, if the oil phase comprises highly polar materials, these materials may reduce the diffusion of the acrylate oligomers and polymers to the oil/water interface and result in a very thin, highly permeable shell. Incorporation of a partitioning modifier can adjust the polarity of the core, thereby changing the partition coefficient of the polar materials in the partitioning modifier versus the acrylate oligomers, and can result in the establishment of a well-defined, highly impermeable shell. The partitioning modifier may be combined with the core's benefit agent prior to incorporation of the wall-forming monomers.

The partitioning modifier may be present in the core at a level of from about 5% to about 60%, preferably from about 20% to about 50%, more preferably from about 30% to about 50%, by weight of the core.

The partitioning modifier may comprise a material selected from the group consisting of vegetable oil, modified vegetable oil, mono-, di-, and tri-esters of $C_4$-$C_{24}$ fatty acids, isopropyl myristate, dodecanophenone, lauryl laurate, methyl behenate, methyl laurate, methyl palmitate, methyl stearate, and mixtures thereof. The partitioning modifier may preferably comprise or even consist of isopropyl myristate. The modified vegetable oil may be esterified and/or brominated. The modified vegetable oil may preferably comprise castor oil and/or soybean oil. U.S. Patent Application Publication 20110268802, incorporated herein by reference, describes other partitioning modifiers that may be useful in the presently described delivery particles.

Delivery particles may be made according to known methods. Methods may be further adjusted to achieve desired characteristics described herein, such as volume-weighted particle size, relative amounts of benefit agent and/or partitioning modifier, etc.

For example, the present disclosure relates to a process of making a population of delivery particles comprising a core and a polymer wall encapsulating the core. The process may comprise the step of providing an oil phase. The oil phase may comprise a benefit agent and a partition modifier, as described above. The process may further comprise dissolving or dispersing into the oil phase one or more multifunctional (meth)acrylate monomers or oligomers having at least two, and preferably at least three, at least four, at least five, or even at least six radical.

The multifunctional monomers or oligomers are described in more detail above. Among other things, the multifunctional monomers or oligomers may comprise a multifunctional aromatic urethane acrylate, preferably a tri-, tetra-, penta-, or hexafunctional aromatic urethane acrylate, or mixtures thereof, preferably comprising a hexafunctional aromatic urethane acrylate. The monomer or oligomer may comprise one or more multifunctional aliphatic urethane acrylates, which may be dissolved or dispersed into the oil phase. The process may further comprise dissolving or dispersing one or more of an amine (meth)acrylate or an acidic (meth)acrylate into the oil phase.

The process further comprises a water phase comprising a water soluble polysaccharide comprising at least one amine group (described above) and a persulfate initiator.

The water phase may further comprise a polymer comprising hydroxyl moieties (described above) an emulsifier, a surfactant, or a combination thereof. Preferably the pH from the water phase is adjusted from 3 to 7, more preferably from 4 to 6, and even more preferably at 4.5. The process may further comprise the step of dissolving or dispersing into the water phase one or more water-soluble or water-dispersible mono- or multi-functional (meth)acrylate monomers and/or oligomers.

The process may comprising a step of dissolving or dispersing into the water phase, the oil phases, or both, one or more amine (meth)acrylates, acidic (meth)acrylates, polyethylene glycol di(meth)acrylates, ethoxylated mono- or multi-functional (meth)acrylates, and/or other (meth)acrylate monomers and/or oligomers.

In general, the oil soluble multifunctional monomer is soluble or dispersible in the oil phase, typically soluble at least to the extent of 0.1 grams in 100 ml of the oil, or dispersible or emulsifiable therein at 50° C. The water soluble multifunctional monomers are typically soluble or dispersible in water, typically soluble at least to the extent of 1 gram in 100 ml of water, or dispersible therein at 22° C.

Typically, the oil phase is combined with an excess of the water phase. If more than one oil phase is employed, these generally are first combined, and then combined with the water phase. If desired, the water phase can also comprise one or more water phases that are sequentially combined.

The oil phase may be emulsified into the water phase under high shear agitation to form an oil-in-water emulsion, which may comprise droplets of the core materials dispersed in the water phase. Typically, the amount of shear agitation applied can be controlled to form droplets of a target size, which influences the final size of the finished encapsulates.

The dissolved or dispersed monomers may be reacted by heating or actinic irradiation of the emulsion. The reaction can form a polymer wall at an interface of the droplets and the water phase. The radical polymerizable groups of the multifunctional monomer or oligomer, upon heating, facilitate self-polymerization.

One or more free radical initiators may be provided to the oil phase, the water phase, or both, preferably both. For example, the process may comprise adding one or more free radical initiators to the water phase, for example to provide a further source of free radicals upon activation by heat. The process may comprise adding one or more free radical initiators to the oil phase. The one or more free radical initiators may be added to the water phase, the oil phase, or both in an amount of from greater than 0% to about 5%, by weight of the respective phase. Latent initiators are also contemplated where a first action, particularly a chemical reaction, is needed to transform the latent initiator into an active initiator which subsequently initiates polymerization upon exposure to polymerizing conditions. Where multiple initiators are present, it is contemplated, and preferred, that each initiator be initiated or suitably initiated by a different condition.

Alternatively, the reacting step may be carried out in the absence of an initiator, as it has surprisingly been found that encapsulates may form, even when a free radical initiator is not present.

In the described process, the heating step may comprise heating the emulsion from about 1 hour to about 20 hours, preferably from about 2 hours to about 15 hours, more preferably about 4 hours to about 10 hours, most preferably from about 5 to about 7 hours, thereby heating sufficiently to transfer from about 500 joules/kg to about 5000 joules/kg to said emulsion, from about 1000 joules/kg to about 4500 joules/kg to said emulsion, from about 2900 joules/kg to about 4000 joules/kg to said emulsion.

Prior to the heating step, the emulsion may be characterized by a volume-weighted median particle size of the emulsion droplets of from about 0.5 microns to about 100 microns, even from about 1 microns to about 60 microns, or even from 20 to 50 microns, preferably from about 30 microns to about 50 microns, with a view to forming a population of delivery particles with a volume-weighted target size, for example, of from about 30 to about 50 microns.

The benefit agent may be selected as described above and is preferably a fragrance that comprises one or more perfume raw materials. The benefit agent may be the primary, or even only component, of the oil phase into which the other materials are dissolved or dispersed.

The partitioning modifier may be selected from the group consisting of isopropyl myristate, vegetable oil, modified vegetable oil, mono-, di-, and tri-esters of C4-C24 fatty acids, dodecanophenone, lauryl laurate, methyl behenate, methyl laurate, methyl palmitate, methyl stearate, and mixtures thereof, preferably isopropyl myristate. The partitioning modifier may be provided in an amount so as to comprise from about 5% to about 60% by weight of the core of the delivery particle.

As a result of the method of making delivery particles provided herein, the delivery particles may be present in an aqueous slurry, for example, the particles may be present in the slurry at a level of from about 10% to about 60%, preferably from about 20% to about 50%, by weight of the slurry. Additional materials may be added to the slurry, such as preservatives, solvents, structurants, or other processing or stability aids. The slurry may comprise one or more perfumes (i.e., unencapsulated perfumes) that are different from the perfume or perfumes contained in the core of the benefit agent delivery particles.

As discussed previously, an emulsion is formed by emulsifying under high shear agitation the oil or combined oils into the water phase. Optionally the water phase can also include emulsifiers. The water phase emulsifier can be selected form one or more of polyalkylene glycol ether, condensation products of alkyl phenols, aliphatic alcohols, or fatty acids with alkylene oxide, ethoxylated alkyl phenols, ethoxylated arylphenols, ethoxylated polyaryl phenols, carboxylic esters solubilized with a polyol, polyvinyl alcohol, polyvinyl acetate, or copolymers of polyvinyl alcohol polyvinyl acetate, polyacrylamide, poly(N-isopropylacrylamide), poly(2-hydroxypropyl methacrylate), poly(2-ethyl-2-oxazoline), poly(2-isopropenyl-2-oxazoline-co-methyl methacrylate), poly(methyl vinyl ether), and polyvinyl alcohol-co-ethylene). Especially useful polyvinyl alcohols include polyvinyl alcohols of molecular 13,000 to 1,876,000 Daltons, preferably from 13,000 to about 230,000 Daltons, or even from 146,000 to 186,000 Daltons. The polyvinyl alcohol can be partially or fully hydrolyzed. Polyvinyl alcohol partially hydrolyzed in the range of 80 to 95% hydrolyzed is preferred, even more preferred 87% to 89%.

Optionally, deposition aids can be included, or applied as a coating in one or more layers over formed or forming delivery particles, to increase deposition or adhesion of the delivery particles to various surfaces such as various substrates including but not limited to paper, fabric skin, hair, towels, or other surfaces. Deposition aids can include poly (meth)acrylate, polyethylene-maleic anhydride), polyamine, wax, polyvinylpyrrolidone, polyvinylpyrrolidone co-polymers, polyvinylpyrrolidone-ethyl acrylate, polyvinylpyrrolidone-vinyl acrylate, polyvinylpyrrolidone methylacrylate, polyvinylpyrrolidone-vinyl acetate, polyvinyl acetal, polyvinyl butyral, polysiloxane, poly(propylene maleic anhydride), maleic anhydride derivatives, co-polymers of maleic anhydride derivatives, polyvinyl alcohol, styrene-butadiene latex, gelatin, gum Arabic, carboxymethyl cellulose, carboxymethyl hydroxyethyl cellulose, hydroxyethyl cellulose, other modified celluloses, sodium alginate, chitosan, casein, pectin, modified starch, polyvinyl acetal, polyvinyl butyral, polyvinyl methyl ether/maleic anhydride, polyvinyl pyrrolidone and its co polymers, polyvinyl pyrrolidone/methacrylamidopropyl trimethyl ammonium chloride), polyvinylpyrrolidone/vinyl acetate, polyvinyl pyrrolidone/dimethylaminoethyl methacrylate, polyvinyl amines, polyvinyl formamides, polyallyl amines and copolymers of polyvinyl amines, polyvinyl formamides, and polyallyl amines and mixtures thereof. In a further embodiment, the above-described delivery particles can comprise a deposition aid, and in a further aspect the deposition aid coats the outer surface of the wall of the delivery particle.

Product Compositions

The present application discloses novel compositions comprising benefit agent containing delivery particles comprising a core and a shell encapsulating the core.

The present application relates to processes for making any of the compositions described herein. The process of making a composition may comprise the step of combining a benefit agent delivery particle as described herein with an adjunct.

The particles may be combined with such one or more adjunct materials when the particles are in one or more forms, including a slurry form, neat particle form, and/or spray dried particle form. The particles may be combined with adjunct materials such as consumer product adjuncts materials by methods that include mixing and/or spraying.

The compositions of the present disclosure can be formulated into any suitable form and prepared by any process chosen by the formulator. The particles and adjunct materials may be combined in a batch process, in a circulation loop process, and/or by an in-line mixing process. Suitable equipment for use in the processes disclosed herein may include continuous stirred tank reactors, homogenizers, turbine agitators, recirculating pumps, paddle mixers, plough shear mixers, ribbon blenders, vertical axis granulators and drum mixers, both in batch and, where available, in continuous process configurations, spray dryers, and extruders.

If desired, the delivery particles can be separated from the aqueous medium. The delivery particles can either be used as in an aqueous slurry, used as a dewatered cake, or used in dry powder form depending on the application.

The delivery particles of the invention can be incorporated dry, as an aqueous slurry, as a coating or as a gel into a variety of commercial products to yield novel and improved articles of manufacture, including incorporation into or onto foams, mattresses, bedding, cushions, added to cosmetics or to medical devices, incorporation into or onto packaging, dry wall, construction materials, heat sinks for electronics, cooling fluids, incorporation into insulation, used with lotions, incorporation into gels including gels for coating fabrics, automotive interiors, and other structures or articles, including clothing, footwear, personal protective equipment and any other article where use of the improved capsules of the invention is deemed desirable. The articles of manufacture can be selected from the group consisting of a soap, a surface cleaner, a laundry detergent, a fabric softener, a shampoo, a textile, a paper towel, an adhesive, a wipe, a diaper, a feminine hygiene product, a facial tissue, a pharmaceutical, a napkin, a deodorant, a foam, a pillow, a mattress, bedding, a cushion, a cosmetic, a medical device, an agricultural product, packaging, a cooling fluid, a wallboard, and an insulation.

The article of manufacture using the delivery particles of the invention can be selected from the group consisting of an agricultural formulation, a slurry encapsulating an agricultural active, a population of dry microcapsules encapsulating an agricultural active, an agricultural formulation encapsulating an insecticide, and an agricultural formulation for delivering a preemergent herbicide. The agricultural active in an agricultural formulation such as a slurry can be selected from any of an agricultural herbicide, an agricultural pheromone, an agricultural pesticide, an agricultural nutrient, an insect control agent and a plant stimulant.

In agricultural applications, the microcapsules of the invention assist with targeted delivery to a surface or plant, protecting the benefit agent such as an agricultural active, herbicide or nutrient until delivered to the site of application and/or released.

Fabric Care Compositions

Fabric care compositions of the present invention may include additional adjunct ingredients that include: bleach activators, surfactants, builders, chelating agents, dye transfer inhibiting agents, dispersants, enzymes, and enzyme stabilizers, catalytic metal complexes, polymeric dispersing agents, clay and soil removal/anti-redeposition agents, suds suppressors, dyes, additional perfumes and perfume delivery systems, structure elasticizing agents, fabric softeners, carriers, hydrotropes, processing aids, structurants, anti-agglomeration agents, coatings, formaldehyde scavengers and/or pigments. Other variants of Applicants' compositions do not contain one or more of the following adjuncts materials: bleach activators, surfactants, builders, chelating agents, dye transfer inhibiting agents, dispersants, enzymes, and enzyme stabilizers, catalytic metal complexes, polymeric dispersing agents, clay and soil removal/anti-redeposition agents, suds suppressors, dyes, additional perfumes and perfume delivery systems, structure elasticizing agents, fabric softeners, carriers, hydrotropes, processing aids, structurants, anti-agglomeration agents, coatings, formaldehyde scavengers, malodor reduction materials and/or pigments. The precise nature of these additional components, and levels of incorporation thereof, will depend on the physical form of the composition and the nature of the operation for which it is to be used. However, when one or more adjuncts are present, such one or more adjuncts may be present as detailed below. The following is a non-limiting list of suitable additional adjuncts.

Deposition Aid

The fabric care composition may comprise from about 0.01% to about 10%, from about to about 5%, or from about 0.15 to about 3% of a deposition aid. The deposition aid may be a cationic or amphoteric polymer. The deposition aid may be a cationic polymer. Cationic polymers in general and their method of manufacture are known in the literature. The cationic polymer may have a cationic charge density of from about 0.005 to about 23 meq/g, from about to about 12 melt/g, or from about 0.1 to about 7 meg/g, at the pH of the composition. For amine-containing polymers, wherein the charge density depends on the pH of the composition, charge density is measured at the intended use pH of the product. Such pH will generally range from about 2 to about 11, more generally from about 2.5 to about 9.5. Charge density is calculated by dividing the number of net charges per repeating unit by the molecular weight of the repeating unit. The positive charges may be located on the backbone of the polymers anchor the side chains of polymers.

The weight-average molecular weight of the polymer may be from about 500 Daltons to about 5,000,000 Daltons, or from about 1,000 Daltons to about 2,000,000 Daltons, or from about 2,500 Daltons to about 1,500,000 Daltons, as determined by size exclusion chromatography relative to polyethylene oxide standards with RI detection. The weight-average molecular weight of the cationic polymer may be from about 500 Daltons to about 37,500 Daltons.

Surfactants: Surfactants utilized can be of the anionic, nonionic, zwitterionic, ampholytic or cationic type or can comprise compatible mixtures of these types. Anionic and nonionic surfactants are typically employed if the fabric care product is a laundry detergent. On the other hand, cationic surfactants are typically employed if the fabric care product is a fabric softener. In addition to the anionic surfactant, the fabric care compositions of the present invention may further contain a nonionic surfactant. The compositions of the present invention can contain up to about 30%, alternatively from about 0.01% to about 20%, more alternatively from about 0.1% to about 10%, by weight of the composition, of a nonionic surfactant. The nonionic surfactant may comprise an ethoxylated nonionic surfactant. Suitable for use herein are the ethoxylated alcohols and ethoxylated alkyl phenols of the formula $R(OC_2H_4)n$ OH, wherein is selected from the group consisting of aliphatic hydrocarbon radicals containing from about 8 to about 20 carbon atoms and alkyl phenyl radicals in which the alkyl groups contain from about 8 to about 12 carbon atoms, and the average value of n is from about 5 to about 15.

The fabric care compositions of the present invention may contain up to about 30%, alternatively from about 0.01% to about 20%, more alternatively from about 0.1% to about 20%, by weight of the composition; of a cationic surfactant. For the purposes of the present invention, cationic surfactants include those which can deliver fabric care benefits. Non-limiting examples of useful cationic surfactants include: fatty amines; quaternary ammonium surfactants; and imidazoline quat materials.

Non-limiting examples of fabric softening actives are N, N-bis(stearoyl-oxy-ethyl) N,N-dimethylammonium chloride; N,N-bis(tallowoyl-oxy-ethyl) N,N-dimethylammonium chloride, N,N-bis(stearoyl-oxy-ethyl)N-(2 hydroxyethyl)N-methyl ammonium methyl sulfate; 1,2 di(stearoyl-oxy) 3 trimethyl ammoniumpropane chloride; dialkylenedimethylammonium salts such as dicanoladimethylammonium chloride, di(hard)tallowdimethylammonium chloride dicanoladimethylammonium methyl sulfate; 1-methyl-1-stearoylamidoethyl-2-stearoylimidazolinium methyl sulfate; 1-tallowylamidoethyl-2-tallowylimidazoline, N,N"-dialkyldiethylenetriamine; the reaction product of N-(2-hydroxyethyl)-1,2-ethylenediamine or N-(2-hydroxyisopropyl)-1,2-ethylenediamine with glycolic acid, esterified with fatty acid, where the fatty acid is (hydrogenated) tallow fatty acid, palm fatty acid, hydrogenated palm fatty acid, oleic acid, rapeseed fatty acid, hydrogenated rapeseed fatty acid; polyglycerol esters (PGEs), oily sugar derivatives, and wax emulsions and a mixture of the above.

It will be understood that combinations of softener actives disclosed above are suitable for use herein.

Builders

The compositions may also contain from about 0.1% to 80% by weight of a builder. Compositions in liquid form generally contain from about 1% to 10% by weight of the builder component. Compositions in granular form generally contain from about 1% to 50% by weight of the builder component. Detergent builders are well known in the art and can contain, for example, phosphate salts as well as various organic and inorganic nonphosphorus builders. Water-soluble, nonphosphorus organic builders useful herein include the various alkali metal, ammonium and substituted ammonium polyacetates, carboxylates, polycarboxylates and polyhydroxy sulfonates. Examples of polyacetate and polycarboxylate builders are the sodium, potassium, lithium, ammonium and substituted ammonium salts of ethylene diamine tetraacetic acid; nitrilotriacetic acid, oxydisuccinic acid, mellitic acid, benzene polycarboxylic acids, and citric acid. Other polycarboxylate builders are the oxydisuccinates and the ether carboxylate builder compositions comprising a combination of tartrate monosuccinate and tartrate disuccinate. Builders for use in liquid detergents include citric acid. Suitable nonphosphorus, inorganic builders include the silicates, aluminosilicates, borates and carbonates, such as sodium and potassium carbonate, bicarbonate, sesquicarbonate, tetraborate decahydrate, and silicates having a weight ratio of SiO2 to alkali metal oxide of from about 0.5 to about 4.0, or from about 1.0 to about 2.4. Also useful are aluminosilicates including zeolites.

Dispersants

The compositions may contain from about 0.1%, to about 10%, by weight of dispersants. Suitable water-soluble organic materials are the homo- or co-polymeric acids or their salts, in which the polycarboxylic acid may contain at least two carboxyl radicals separated from each other by not more than two carbon atoms. The dispersants may also be alkoxylated derivatives of polyamines, and/or quaternized derivatives.

Enzymes

The compositions may contain one or more detergent enzymes which provide cleaning performance and/or fabric care benefits. Examples of suitable enzymes include hemicellulases, peroxidases, proteases, cellulases, xylanases, lipases, phospholipases, esterases, cutinases, pectinases, keratanases, reductases, oxidases, phenoloxidases, lipoxygenases, ligninases, pullulanases, tannases, pentosanases, malanases, β-glucanases, arabinosidases, hyaluronidase, chondroitinase, laccase, and amylases, or mixtures thereof. A typical combination may be a cocktail of conventional applicable enzymes like protease, lipase, cutinase and/or cellulase in conjunction with amylase. Enzymes can be used at their art-taught levels, for example at levels recommended by suppliers such as Novozymes and Genencor. Typical levels in the compositions are from about 0.0001% to about 5%. When enzymes are present, they can be used at very low levels, e.g., from about 0.001% or lower; or they can be used in heavier-duty laundry detergent formulations at higher levels, e.g., about 0.1% and higher. In accordance with a preference of some consumers for "non-biological" detergents, the compositions may be either or both enzyme-containing and enzyme-free.

Dye Transfer Inhibiting Agents

The compositions may also include from about 0.0001%, from about 0.01%, from about by weight of the compositions to about 10%, about 2%, or even about 1% by weight of the compositions of one or more dye transfer inhibiting agents such as polyvinylpyrrolidone polymers, polyamine N-oxide polymers, copolymers of N-vinylpyrrolidone and N-vinylimidazole, polyvinyloxazolidones and polyvinylimidazoles or mixtures thereof.

Chelant

The compositions may contain less than about 5%, or from about 0.01% to about 3% of a chelant such as citrates; nitrogen-containing, P-free aminocarboxylates such as EDDS, EDTA and DTPA; aminophosphonates such as diethylenetriamine pentamethylenephosphonic acid and, ethylenediamine tetramethylenephosphonic acid; nitrogen-free phosphonates e.g., HEDP; and nitrogen or oxygen containing, P-free carboxy-late-free chelants such as compounds of the general class of certain macrocyclic N-ligands such as those known for use in bleach catalyst systems.

Bleach System

Bleach systems suitable for use herein contain one or more bleaching agents. Non-limiting examples of suitable bleaching agents include catalytic metal complexes; activated peroxygen sources; bleach activators; bleach boosters; photobleaches; bleaching enzymes; free radical initiators; $H_2O_2$; hypohalite bleaches; peroxygen sources, including perborate and/or percarbonate and combinations thereof. Suitable bleach activators include perhydrolyzable esters and perhydrolyzable imides such as, tetraacetyl ethylene diamine, octanoylcaprolactam, benzoyloxybenzenesulphonate, nonanoyloxybenzene-sulphonate, benzoylvalerolactam, dodecanoyloxybenzenesulphonate. Other bleaching agents include metal complexes of transitional metals with ligands of defined stability constants.

Stabilizer

The compositions may contain one or more stabilizers and thickeners. Any suitable level of stabilizer may be of use; exemplary levels include from about 0.01% to about 20%, from about to about 10%, or from about 0.1% to about 3% by weight of the composition. Non-limiting examples of stabilizers suitable for use herein include crystalline, hydroxyl-containing stabilizing agents, trihydroxystearin, hydrogenated oil, or a variation thereof, and combinations thereof. In some aspects, the crystalline, hydroxyl-containing stabilizing agents may be water-insoluble wax-like substances, including fatty acid, fatty ester or fatty soap. In other aspects, the crystalline, hydroxyl-containing stabilizing agents may be derivatives of castor oil, such as hydrogenated castor oil derivatives, for example, castor wax. Other stabilizers include thickening stabilizers such as gums and other similar polysaccharides, for example gellan gum, carrageenan gum, and other known types of thickeners and rheological additives. Exemplary stabilizers in this class include gum-type polymers (e.g. xanthan gum), polyvinyl alcohol and derivatives thereof, cellulose and derivatives thereof including cellulose ethers and cellulose esters and tamarind gum (for example, comprising xyloglucan polymers), guar gum, locust bean gum (in some aspects comprising galactomannan polymers), and other industrial gums and polymers.

Silicones

Suitable silicones comprise Si—O moieties and may be selected from (a) non-functionalized siloxane polymers, (b) functionalized siloxane polymers, and combinations thereof. The molecular weight of the organosilicone is usually indicated by the reference to the viscosity of the material. The organosilicones may comprise a viscosity of from about 10 to about 2,000,000 centistokes at 25° C. Suitable organosilicones may have a viscosity of from about 10 to about 800,000 centistokes at 25° C.

TEST METHODS

It is understood the test methods disclosed in the TEST METHODS Section should be used to determine the respective values of the parameters described and claimed in the present application.

Method for Treating Fabrics with Fabric Softener/Liquid Laundry Detergent Composition Prior to Head Space Concentration Determination The method to treat fabrics with fabric softener composition comprises a fabric pretreatment phase followed by a fabric treatment phase.

Fabric Pretreatment Phase:

2.9±0.1 kg of ballast fabrics containing cotton, polyester, polycotton, 3 white knitted cotton fabric tracers (from Warwick Equest) and 3 white polyester tracers are washed 4 times with 50 g Non-perfumed Ariel Sensitive (Nordics) at 60° C. with 2 grains per gallon (gpg) water, 1 h 26 min cycle, 1600 rpm, in a front loader washing machine such as Miele (Novotronic W986/Softronic W467/W526/W527/W1614/W1714/W2261) or equivalent and then washed once with no detergent at 60° C. with 2 gpg water. After the last wash, fabrics are dried in a 5 kg drum tumble drier with hot air outlet such as Miele Novotronic (T490/T220/T454/T430/T410/T7634) or equivalent and then they are ready to be used for testing.

Fabric Treatment Phase:

2.9±0.1 kg of ballast fabrics containing cotton, polyester, polycotton, 3 white knitted cotton fabric tracers (from Warwick Equest) and 3 white polyester tracers are washed in 15 gpg water under different conditions depending on the product to be tested:

1. at 40° C., 1 h 24 minutes cycle, 1200 rpm without laundry detergent to avoid interference in the fabric softener evaluation. Liquid fabric softener composition is pre-diluted in 2 L of C water with a hardness of 15 gpg 5 min before the starting of the last rinse and added to the last rinse while the washing machine is taking the water. This is a requirement to ensure homogeneous dispensability over the load and minimize the variability of the test results. All fabrics are line dried in a control temperature (25° C.) and humidity (60%) room for 24 hours prior to head space concentration determination; or
2. at 30° C., 1 h 15 minutes cycle, 1000 rpm using the laundry detergent to be evaluated without fabric softener. The laundry detergent is dosed in a dosing ball and introduced in the tumble together with the fabrics.

Method for Determining Head Space Concentration

Three white knitted cotton fabric tracers and/or 3 white polyester fabric tracers treated with fabric softener compositions (see Method for treating fabrics with fabric softener composition prior to head space concentration determination) are used for the analysis. A piece of 5×5 cm is gently cut from the center of each fabric tracer and analyzed by fast head space gas chromatography/mass spectroscopy ("GC/MS") using an Agilent DB-5UI 30 m×0.25×0.25 column (part #122-5532UI) in splitless mode. Each fabric tracer cut is transferred into 25 mL glass headspace vials. The fabric samples are allowed to equilibrate for 10 minutes at 65° C. before the headspace above the fabrics is sampled using a 23 gauge 50/30UM DVB/CAR/PDMS SPME fiber (Sigma-Aldrich part #57298-U) for 5 minutes. The SPME fiber is subsequently on-line thermally desorbed into the GC using a ramp from 40° C. (0.5 min) to 270° C. (0.25 min) at 17° C./min. The perfume raw materials with a molecular weight between 35 and 300 m/z are analyzed by fast GC/MS in full scan mode. The amount of perfume in the headspace is expressed as nmol/L.

Sample Preparation for Biodegradability Measurements

The water soluble or water dispersible material is purified via crystallization till a purity of above 95% is achieved and dried before biodegradability measurement.

The oily medium comprising the benefit agent needs to be extracted from the delivery particle slurry in order to only analyze the polymer wall. Therefore, the delivery particle slurry is washed between 3 and 10 times with water to remove all soluble polymers that are not reacted in the polymer wall, such as colloids and depositions aids. Then, it is further washed with organic solvents to extract the oily medium comprising the benefit agent till weight percentage of oily medium is below 5% based on total delivery particle polymer wall. Finally, the polymer wall is dried and analyzed.

Weight ratio of delivery particle:solvent is 1:3. Residual oily medium is determined by thermogravimetric analysis (60 minutes isotherm at 100° C. and another 60 min isotherm at 250° C.). The weight loss determined needs to be below 5%.

OECD 301 B—Biodegradability Method

Accumulative $CO_2$ release is measured over 60 days following the guidelines of the Organisation for Economic Cooperation and Development (OECD)—OECD (1992), *Test No.* 301*: Ready Biodegradability*, OECD Guidelines for the Testing of Chemicals, Section 3, OECD Publishing, Paris, https://doi.org/10.1787/9789264070349-en.

Leakage

The amount of benefit agent leakage from the benefit agent containing delivery particles is determined according to the following method:

1. Obtain two 1 g samples of the raw material slurry of benefit agent containing delivery particles.
2. Add 1 g of the raw material slurry of benefit agent containing delivery particles to 99 g of the consumer product matrix in which the particles will be employed and label the mixture as Sample 1. Immediately use the second 1 g sample of raw material particle slurry in Step d below, in its neat form without contacting consumer product matrix, and label it as Sample 2.
3. Age the delivery particle-containing product matrix (Sample 1) for 1 week at 35° C. in a sealed glass jar.
4. Using filtration, recover the particles from both samples. The particles in Sample 1 (in consumer product matrix) are recovered after the aging step. The particles in Sample 2 (neat raw material slurry) are recovered at the same time that the aging step began for sample 1.
5. Treat the recovered particles with a solvent to extract the benefit agent materials from the particles.
6. Analyze the solvent containing the extracted benefit agent from each sample, via chromatography.
7. Integrate the resultant benefit agent peak areas under the curve and sum these areas to determine the total quantity of benefit agent extracted from each sample.
8. Determine the percentage of benefit agent leakage by calculating the difference in the values obtained for the total quantity of benefit agent extracted from Sample 2 (S2) minus Sample 1 (S1), expressed as a percentage of the total quantity of benefit agent extracted from Sample 2 (s2), as represented in the equation below:

$$\%\ \text{Leakage} = \left(\frac{S2 - S1}{S2}\right) \times 10$$

Volume Weighted Mean Particle Size

Particle size is measured using static light scattering devices, such as an Accusizer 780A, made by Particle Sizing Systems, Santa Barbara Calif. The instrument is calibrated from 0 to 300μ using Duke particle size standards. Samples for particle size evaluation are prepared by diluting about 1 g emulsion, if the volume weighted mean particle size of the emulsion is to be determined, or 1 g of benefit agent containing delivery particles slurry, if the finished particles volume weighted mean particle size is to be determined, in about 5 g of de-ionized water and further diluting about 1 g of this solution in about 25 g of water.

About 1 g of the most dilute sample is added to the Accusizer and the testing initiated, using the auto dilution feature. The Accusizer should be reading in excess of 9200 counts/second. If the counts are less than 9200 additional sample should be added. The Accusizer will dilute the test sample until 9200 counts/second and initiate the evaluation. After 2 minutes of testing the Accusizer will display the results, including volume-weighted mean size.

The broadness index can be calculated by determining the particle size at which 95% of the cumulative particle volume is exceeded (95% size), the particle size at which 5% of the cumulative particle volume is exceeded (5% size), and the median volume-weighted particle size (50% size—50% of the particle volume both above and below this size). Broadness Index=((95% size)−(5% size)/50% size).

Gel Permeation Chromatography with Multi-Angle Light Scattering and Refractive Index Detection (GPC-MALS/RI) for Polymer Molecular Weight Distribution Measurement Gel Permeation Chromatography (GPC) with Multi-Angle Light Scattering (MALS) and Refractive Index (RI) Detection (GPC-MALS/RI) permits the measurement of absolute molecular weight of a polymer without the need for column calibration methods or standards. The GPC system allows molecules to be separated as a function of their molecular size. MALS and RI allow information to be obtained on the number average (Mn) and weight average (Mw) molecular weight. The Mw distribution of water-soluble polymers like polyvinylalcohol, polysaccharides, polyacrylates materials is typically measured by using a Liquid Chromatography system (e.g., Agilent 1260 Infinity pump system with OpenLab Chemstation software, Agilent Technology, Santa Clara, CA, USA) and a column set (e.g., Waters ultrahydrogel guard column, 6 mm ID×40 mm length, two ultrahydrogel linear columns, 7.8 mm ID×300 mm length, Waters Corporation of Milford, Mass., USA) which is operated at 40° C. The mobile phase is 0.1M sodium nitrate in water containing 0.02% sodium azide and is pumped at a flow rate of 1 mL/min, isocratically. A multiangle light scattering (MALS) detector DAWN® and a differential refractive index (RI) detector (Wyatt Technology of Santa Barbara, Calif, USA) controlled by Wyatt Astra® software are used. A sample is typically prepared by dissolving polymer materials in the mobile phase at −1 mg per ml and by mixing the solution for overnight hydration at room temperature. The sample is filtered through a 0.8 μm Versapor membrane filter (PALL, Life Sciences, NY, USA) into the LC autosampler vial using a 3-ml syringe before the GPC analysis. A dn/dc (differential change of refractive index with concentration) value is measured on the polymer materials of interest and used for the number average and weight average molecular weights determination by the Astra detector software.

EXAMPLES

Example 1: Fragrance Oil Delivery Particles Comprising Poly(Vinyl Alcohol) Covalently Bonded to the Polyacrylic Wall Material A first composition was prepared in a 300 mL beaker mixing 78.3 g of fragrance oil, 0.11 g of 2-carboxylethyl acrylate (Merck), 2.25 g CN975—hexafunctional aromatic urethane acrylate oligomer—(Sartomer), 0.2 g 2,2-azobis(2,4-dimethylvaleronitrile) (Chemours) and 0.05 g 2,2-azobis(2-methylbutyronitrile) (Chemours) at 25° C. via magnetic stirring. Then, 39.11 g of isopropyl myristate (BASF) was added to the solution at 25° C. and mixed for 15 minutes with a magnetic stirrer till a homogeneous composition was obtained.

A second composition was prepared comprising 238.06 g of a 2 wt % Selvol 540 poly(vinyl alcohol) (Sekisui) aqueous solution (233.26 g distilled water and 4.8 g Selvol 540). Once Selvol 540 is fully dissolved, 0.89 g of 4,4-azobis(4-cyanovaleric acid) (Chemours) was added and mixed via magnetic stirrer at 25° C. until full dissolution.

The first composition was added to the second composition and emulsified using an overhead mixer (such as IKA overhead mixer) at 1,200 rpm for 30 minutes with a 90 degrees 4 blades stirrer. Then the emulsion was transferred to a 500 mL coated reactor equipped with reflux condenser and overhead stirrer with anchor type impeller. Mixing was kept at 180 rpm for 14 h with the following temperature ramp: i) temperature was first increased to 60° C. in 15 minutes and held at 60° C. for 45 minutes; ii) temperature was increased to 75° C. in 30 minutes, 0.24 g potassium persulfate initiator were added step by step and the mixture held at 75° C. for 4 hours; iii) temperature was increased to 90° C. in 30 minutes and held at 90° C. for 8 hours. The delivery particle system was then cooled to 20° C. and used without further treatment.

Example 2: Fragrance Oil Delivery Particles Comprising Poly(Vinyl Alcohol) and Chitosan Covalently Bounded to the Polyacrylic Wall Material Samples 2-10

Samples 2-10 were prepared by the same procedure as in Example 1 except that the two compositions, the aqueous solution and the fragrance oil containing solution, were prepared as follows:

A first composition was prepared in a 300 mL beaker by mixing 150.8 g of Fragrance Oil, g of 2-carboxyethyl acrylate (Merck), 11.23 g CN975—hexafunctional aromatic urethane acrylate oligomer—(Sartomer), 1.98 g 2,2-azobis(2,4-dimethylvaleronitrile) (Chemours) and 0.45 g 2,2-azobis(2-methylbutyronitrile) (Chemours) at 25° C. using magnetic stirring. Then 71.35 g of isopropyl myristate (BASF) was added to the solution at 25° C. and mixed for 15 minutes with a magnetic stirrer until a homogeneous composition is obtained.

A second composition was prepared comprising 360 g of a Selvol 540 poly(vinyl alcohol) (Sekisui) aqueous solution ranged between 1 and 3 wt %, 1.79 g acetic acid (0.5 wt %) and Chitoclear (Primex) in a concentration between 0.5-1.5 wt %, at 25° C. via magnetic stirring. Once the chitosan is fully dissolved, the radical formation initiator, 0.7 wt %, was added and dissolved by mixing for 1 hour with a magnetic stirrer at 25° C., as shown in Samples 9-17 in TABLE 1 below.

TABLE 1

| Sample | Radical initiator | % chitosan in the water solution | % Selvol 540 in the water solution |
|---|---|---|---|
| 2 | Potassium persulfate | 1 | 1 |
| 3 | Ammonium persulfate | 1 | 1 |
| 4 | Sodium persulfate | 1 | 1 |
| 5 | Ammonium persulfate | 1 | 2 |
| 6 | Ammonium persulfate | 0.5 | 1 |
| 7 | Potassium persulfate | 0.5 | 1 |
| 8 | Sodium persulfate | 0.5 | 1 |
| 9 | Ammonium persulfate | 1.5 | 2 |
| 10 | Potassium persulfate | 1.5 | 2 |

Example 3: Liquid Fabric Softener Comprising Delivery Particles

Liquid Fabric Softener comprising Delivery Particles was prepared as described below in TABLE 2.

A fabric softener composition was prepared according to WO2018/170356. The fabric softener composition was finished by adding the delivery particle slurry using an IKA Ultra Turrax (dispersing element 8G) operated at 10 000 rpm for 1 minute, as shown below in TABLE 2.

TABLE 2

| | Sample 1A | Sample 2A | Sample 5A | Sample 10A |
|---|---|---|---|---|
| | Weight % | | | |
| Deionized water | To balance | To balance | To balance | To balance |
| NaHEDP | 0.007 | 0.007 | 0.007 | 0.007 |
| Formic acid | 0.045 | 0.045 | 0.045 | 0.045 |
| HCl | 0.001 | 0.001 | 0.001 | 0.001 |
| Preservative[a] | 0.023 | 0.023 | 0.023 | 0.023 |
| FSA[b] | 9.19 | 5 | 11 | 9.19 |
| Antifoam[c] | 0.101 | 0.101 | 0.101 | 0.101 |
| Coconut oil | 0.31 | | 0.31 | 0.31 |
| Isopropanol | 0.94 | 0.8 | 0.94 | 0.94 |
| $CaCl_2$ | 0.008 | 0.008 | 0.008 | 0.008 |
| Perfume | 0.4 | | | |
| Perfume via delivery particles from Sample 1 | 0.25 | | | |
| Perfume via delivery particles from Sample 2 | | 0.4 | | |
| Perfume via delivery particles from Sample 5 | | | 0.4 | |
| Perfume via delivery particles from Sample 10 | | | | 0.4 |
| Cationic polymer[d] | 0.3 | 0.3 | 0.3 | 0.3 |

[a]Proxel GXL, 20% aqueous dipropylene glycol solution of 1,2-benzisothiazolin-3-one, supplied by Lonza. This material is part of the dispersion that is made and is not added at another point in the process.
[b]DEEDMAC: diethyl-ester-dimethyl-ammonium-chloride
[c]MP10 ®, supplied by Dow Corning, 8% activity
[d]Rheovis ® CDE, cationic polymeric acrylate thickener supplied by BASF

Example 4: Liquid Laundry Detergent Comprising Delivery Particles

Liquid Laundry Detergent Compositions comprising the Delivery Particles were prepared and shown in TABLES 3 below.

TABLE 3

| Ingredient: | Sample 1B | Sample 2B | Sample 3B | Sample 5B % wt | Sample 7B | Sample 9B | Sample 10B |
|---|---|---|---|---|---|---|---|
| C12-45 alkyl-7-ethoxylated | | | | 2.34 | | | |
| C12-14 alkyl-7-ethoxylated | | | | 0.2 | | | |
| Monoethanolamine: $C_{12-14}$ EO•3•$SO_3H$ | | | | 0.5 | | | |
| Linear alkyl benzene sulfonic acid | | | | 4 | | | |
| sodium hydroxide | | | | 1.9 | | | |
| sodium cumene sulfonate | | | | 0.18 | | | |
| citric acid | | | | 1.4 | | | |
| C12-18 Fatty acid | | | | 1.1 | | | |
| Solvents (1,2-Propanediol, Ethanol) | | | | 1.1 | | | |
| Chelants | | | | 0.2 | | | |
| Soil suspending alkoxylated polyalkylenimine polymer[a] | | | | 0.68 | | | |
| Minors (stabilizers, preservatives . . . ) | | | | 1 | | | |
| Hydrogenated castor oil | | | | 0.2 | | | |
| Perfume | 0.5 | 0.25 | 0.7 | 1 | 0.1 | | |
| Perfume via delivery particles from Sample 1 | 0.25 | | | | | | |
| Perfume via delivery particles from Sample 2 | | 0.5 | | | | | |
| Perfume via delivery particles from Sample 3 | | | 0.4 | | | | |
| Perfume via delivery particles from Sample 5 | | | | 0.23 | | | |
| Perfume via delivery particles from Sample 7 | | | | | 0.5 | | |
| Perfume via delivery particles from Sample 9 | | | | | | 0.4 | |
| Perfume via delivery particles from Sample 10 | | | | | | | 0.4 |
| water | | | | up to 100 | | | |

[a]600 g/mol molecular weight polyethylenimine core with 24 ethoxylate groups per —NH and 16 propoxylate groups per —NH. Available from BASF (Ludwigshafen, Germany)

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A delivery particle comprising a core and a wall encapsulating said core, wherein:

the core comprises a benefit agent and a partitioning modifier;

the wall is formed by a radical polymerization reaction between:

a) a water soluble hydroxyl containing linear carbon-chain polymer comprising 1,2-diol and/or 1,3-diol functionality;

b) a multifunctional (meth)acrylate monomer and/or oligomer;

c) optionally, a mono- and/or di-functional monomer and/or oligomer;

d) at least one water soluble thermal free radical initiator;

e) at least one oil soluble thermal free radical initiator;

wherein at least one of the water-soluble initiators is a persulfate and the water soluble hydroxyl containing linear carbon-chain polymer forms carbon/carbon and/or oxygen/carbon bonds with the multifunctional (meth)acrylate monomer and/or oligomer.

2. The delivery particle of claim 1, wherein the benefit agent is a fragrance.

3. The delivery particle of claim 1, wherein the partitioning modifier is selected from the group consisting of isopropyl myristate, vegetable oil, modified vegetable oil, mono-, di-, and tri-esters of C4-C24 fatty acids, dodecanophenone, lauryl laurate, methyl behenate, methyl laurate, methyl palmitate, methyl stearate, and mixtures thereof.

4. The delivery particle of claim 1, wherein the water soluble hydroxyl containing polymer has a degree of hydrolysis from about 55% to about 99%.

5. The delivery particle of claim 1, wherein the water soluble hydroxyl containing linear carbon-chain polymer is partially acetylated.

6. The delivery particle of claim 1, wherein the wall further comprises a polysaccharide.

7. The delivery particle of claim 6, wherein the polysaccharide has at least one amine moiety.

8. The delivery particle of claim 6, wherein the polysaccharide is selected from the group consisting of pectin, carrageenan, cellulose, chitosan, chitin, xanthan gum, tara gum, konjac gum, alginate, hyaluronic acid, amylase, lignin, diutan gum, and mixtures thereof.

9. The delivery particle of claim 1, wherein the water soluble hydroxyl containing linear carbon-chain polymer is at least 20 weight percentage of the total wall.

10. The delivery particle of claim 1, wherein the polysaccharide is at least 2% weight percentage of the total wall.

11. The delivery particle of claim 1, wherein the water soluble hydroxyl containing linear carbon-chain polymer and/or the polysaccharide has a molecular weight from about 30 kDa to about 500 kDa.

12. The delivery particle of claim 1, wherein the water soluble hydroxyl containing linear carbon-chain polymer and/or polysaccharide has a biodegradability above 30% $CO_2$ in 60 days following OECD 301B test.

13. The delivery particle of claim 1, wherein the multifunctional (meth)acrylate monomer and/or oligomer is selected from group consisting of tri-functional (meth)acrylate, tetra-functional (meth)acrylate, penta-functional (meth) acrylate, hexa-functional (meth)acrylate, hepta-functional (meth)acrylate, and mixtures thereof.

14. The delivery particle of claim 1, wherein the multifunctional (meth)acrylate monomers and/or oligomer comprises a hexafunctional aromatic urethane acrylate.

15. The delivery particle of claim 1, wherein the multifunctional (meth)acrylate monomer and/or oligomer comprises a multifunctional aliphatic urethane acrylate.

16. The delivery particle of claim 1, wherein the multifunctional (meth)acrylate monomer and/or oligomer is at least 5%.

17. The delivery particle of claim 1, wherein the mono- and/or di-functional monomer and/or oligomer are independently selected from the group consisting of:

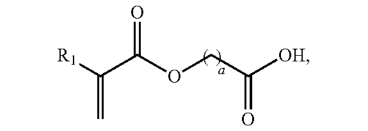

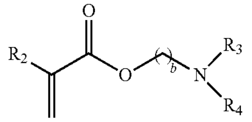

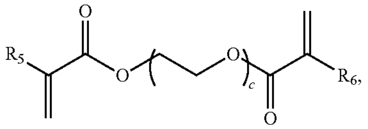

-continued

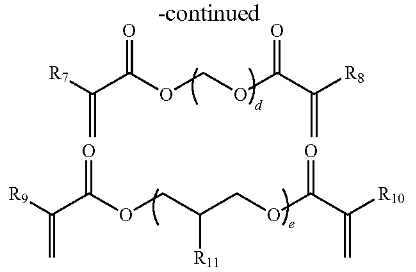

wherein

R1, R2, RS, R6, R7, R8, R9 and RIO are independently selected from the group consisting of a hydrogen (*—H) and a methyl group (*—CH3);

a, b, c and dare integers independently selected from 1 to 10,

R3 and R4 are independently selected from the group consisting of

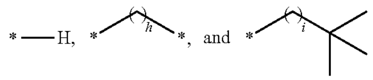

h and i are integers independently selected from 0 to 10;

$R_{11}$ is selected from the group consisting of hydroxyl (*—OH), hydrogen (*—H), and methyl group (*—$CH_3$).

18. The delivery particle of claim 1, wherein the water soluble thermal free radical initiator is selected from the group consisting of ammonium persulfate, potassium persulfate, sodium persulfate and mixtures thereof.

19. The delivery particle of claim 1, wherein the oil soluble thermal free radical initiator is an azo-based initiator.

20. The delivery particle of claim 15, wherein the azo-based initiator is selected from the group consisting of 2,2'-azobis(isobutylnitrile), 2,2'-azobis(2,4-dimethylpentanenitrile), 2,2'-azobis(2,4-dimethylvaleronitrile), 2,2'-azobis (2-methylpropanenitrile), 2,2'-azobis(2-methylbutyronitrile), 1,1'-azobis (cyclohexanecarbonitrile), 1,1'-azobis (cyanocyclohexane) and mixtures thereof.

21. The delivery particle of claim 1, wherein the water soluble hydroxyl containing polymer and/or polysaccharide is fragmented by the water soluble initiator prior to form carbon/carbon, oxygen/carbon, and/or nitrogen/carbon bonds with the multifunctional (meth)acrylate monomer and/or oligomer.

22. The delivery particle of claim 1, wherein the water soluble hydroxyl containing polymer and/or polysaccharide forms carbon/carbon bonds with the multifunctional (meth) acrylate monomer and/or oligomer.

23. The delivery particle of claim 1, wherein the delivery particle is prepared at a pH from about 3 to about 7.

24. The delivery particle of claim 1, wherein the wall has a biodegradability above 30% $CO_2$ in 60 days following OECD 301B test.

25. The delivery particle according to claim 1, wherein the wall of the delivery particles further comprises a coating material selected from the group consisting of poly(meth) acrylate, poly(ethylene-maleic anhydride), polyamine, wax, polyvinylpyrrolidone, polyvinylpyrrolidone co-polymers, polyvinylpyrrolidone-ethy-acrylate, polyvinylpyrrolidone-vinyl acrylate, polyvinylpyrrolidone methacrylate, polyvinylpyrrolidone/vinyl acetate, polyvinyl acetal, polyvinyl butyral, polysiloxane, poly(propylene maleic anhydride), maleic anhydride derivatives, co-polymers of maleic anhydride derivatives, polyvinyl alcohol, styrene-butadiene latex, gelatine, gum arabic, carboxymethyl cellulose, carboxymethyl hydroxyethyl cellulose, hydroxyethyl cellulose, other modified celluloses, sodium alginate, chitosan, chitin, casein, pectin, modified starch, polyvinyl acetal, polyvinyl butyral, polyvinyl methyl ether/maleic anhydride, polyvinyl pyrrolidone and its CO polymers, poly(vinyl pyrrolidone/methacrylamidopropyl trimethyl ammonium chloride), polyvinylpyrrolidone/vinyl acetate, polyvinyl pyrrolidone/dimethylaminoethyl methacrylate, polyvinyl amines, polyvinyl formamides, polyallyl amines, copolymers of polyvinyl amines, and mixtures thereof.

26. An article of manufacture incorporating the microcapsules according to claim 1.

27. The article of manufacture according to claim 26, wherein the article is selected from the group consisting of an agricultural formulation, a slurry encapsulating an agricultural active, a population of dry microcapsules encapsulating an agricultural active, an agricultural formulation encapsulating an insecticide, and an agricultural formulation for delivering a preemergent herbicide.

28. The article of manufacture according to claim 27 wherein the agricultural active is selected from the group consisting of an agricultural herbicide, an agricultural pheromone, an agricultural pesticide, an agricultural nutrient, an insect control agent and a plant stimulant.

* * * * *